(12) United States Patent
Watanabe

(10) Patent No.: US 10,814,639 B2
(45) Date of Patent: Oct. 27, 2020

(54) FIXING AGENT AMOUNT SETTING METHOD, PRINTING DEVICE, AND PRINTING METHOD

(71) Applicant: MIMAKI ENGINEERING CO., LTD., Nagano (JP)

(72) Inventor: Misaki Watanabe, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/974,695

(22) Filed: May 9, 2018

(65) Prior Publication Data

US 2018/0326741 A1 Nov. 15, 2018

(30) Foreign Application Priority Data

May 11, 2017 (JP) .................. 2017-094704

(51) Int. Cl.
*B41J 2/21* (2006.01)
*B41M 5/00* (2006.01)
(Continued)

(52) U.S. Cl.
CPC ............... *B41J 2/211* (2013.01); *B41J 2/175* (2013.01); *B41J 2/195* (2013.01); *B41J 2/2056* (2013.01);
(Continued)

(58) Field of Classification Search
CPC ..... C09D 11/107; C09D 11/30; C09D 11/101; C09D 11/36; C09D 11/40; C09D 11/38; C09D 11/32; C09D 11/322; C09D 11/324; C09D 11/328; C09D 11/102; C09D 11/005; C09D 11/54; C09D 11/52; C08L 67/06; C08L 33/14; C08L 75/14; B41J 2/01; B41J 2/0057; B41J 2/14274; B41J 2/1433; B41J 2/161; B41J 2/1623; B41J 2202/00; B41J 2202/03; B41J 2/14201; B41J 2/211; B41J 2/17; B41J 2/17593; B41J 2/2107; B41J 2/2114; B41J 2/2056; B41J 2/21; B41J 3/60; B41J 2002/012; B41J 2/04598;
(Continued)

(56) References Cited

U.S. PATENT DOCUMENTS

2003/0005945 A1* 1/2003 Onishi ................. B41J 11/0015
347/101
2003/0079652 A1* 5/2003 Choy .................... B41J 2/2107
106/31.58

FOREIGN PATENT DOCUMENTS

JP          2014117921          6/2014

OTHER PUBLICATIONS

"Search Report of European Counterpart Application," dated Oct. 4, 2018, p. 1-p. 5.

* cited by examiner

*Primary Examiner* — Manish S Shah
(74) *Attorney, Agent, or Firm* — JCIPRNET

(57) ABSTRACT

To allow printing through a more appropriate method when carrying out printing using a two-liquid type ink. A fixing agent amount setting method of setting a usage amount of a fixing agent, which is liquid for fixing an ink, which is a colored ink, on a medium, where a fixing agent density, which is an amount of the fixing agent to eject per unit area is made to correspond with a colored ink density, which is an amount of the ink to eject per unit area, and set to a value smaller than or equal to an upper limit value of a fixing agent density corresponding to a maximum fixing agent density at which color unevenness does not occur on the medium.

15 Claims, 6 Drawing Sheets

(51) Int. Cl.
*B41M 7/00* (2006.01)
*B41J 2/175* (2006.01)
*B41J 2/195* (2006.01)
*B41J 2/205* (2006.01)
*B41J 29/393* (2006.01)

(52) U.S. Cl.
CPC ........... *B41J 2/2107* (2013.01); *B41J 2/2132* (2013.01); *B41J 29/393* (2013.01); *B41M 5/0017* (2013.01); *B41M 7/0018* (2013.01)

(58) Field of Classification Search
CPC ................ B41J 2/04588; B41J 2/04595; B41J 2/04586; B41J 2/1755; B41J 2/1117; B41J 11/0015; B41J 11/002; B41J 2/045; B41J 2/14; B41J 3/4073; B41M 5/0011; B41M 5/0017; B41M 5/0047; B41M 7/00; B41M 7/0072; B41M 5/52; B41M 5/5218

See application file for complete search history.

BASE METHOD

FIXING AGENT DENSITY : 30%

NORMAL DENSITY PORTION: OK

HIGH DENSITY PORTION: SMEARING

FIXING AGENT DENSITY : 60%

NORMAL DENSITY PORTION: COLOR UNEVENNESS

HIGH DENSITY PORTION: OK

FIG. 5

| | COLOR PRINTING DENSITY (%) | BASE METHOD FIXING AGENT DENSITY (%) | | | | | IN-LINE METHOD FIXING AGENT DENSITY (%) | | | | |
|---|---|---|---|---|---|---|---|---|---|---|---|
| | | 20 | 40 | 60 | 80 | 100 | 20 | 40 | 60 | 80 | 100 |
| ONE LAYER (ONLY COLOR) | C 20 | O | O | B | B | B | O | O | B | B | B |
| | C 40 | O | B | B | B | B | O | O | B | B | B |
| | C 80 | O | B | B | B | B | O | O | O | B | B |
| | C 80 | O | B | B | B | B | O | O | O | B | B |
| | C 100 | A | O | B | B | B | O | O | O | O | B |
| | CM 100 | A | O | O | B | B | O | O | O | O | O |
| | CMY 100 | O | O | B | B | B | O | O | O | O | O |
| THREE LAYERS (COLOR, WHITE, COLOR) | C 20 | O | O | B | B | B | A | O | O | O | O |
| | C 40 | O | O | B | B | B | A | O | O | O | B |
| | C 60 | O | O | B | B | B | A | O | O | O | B |
| | C 80 | A | O | B | B | B | A | A | O | O | B |
| | C 100 | A | A | B | B | B | A | A | O | O | O |
| | CM 100 | A | A | B | B | B | A | A | O | O | O |
| | CMY 100 | A | A | B | B | B | A | A | O | O | O |

FIXING AGENT AMOUNT SETTING METHOD, PRINTING DEVICE, AND PRINTING METHOD

CROSS REFERENCE TO RELATED APPLICATIONS

This application claims the priority benefit of Japanese Patent Application No. 2017-094704, filed on May 11, 2017. The entirety of the above-mentioned patent application is hereby incorporated by reference herein and made a part of this specification.

TECHNICAL FIELD

The present disclosure relates to a fixing agent amount setting method, a printing device, and a printing method.

DESCRIPTION OF THE BACKGROUND ART

An inkjet printer that carries out printing through the inkjet method is conventionally widely used. Furthermore, various inks such as latex ink, for example, are used in the inkjet printer (see e.g., Japanese Unexamined Patent Publication No. 2014-117921).

Patent Literature 1: Japanese Unexamined Patent Publication No. 2014-117921

SUMMARY

In the inkjet printer, it is necessary to use an ink having an extremely low viscosity in view of the operation of ejecting ink (ink droplet) from a microscopic nozzle of an inkjet head. In this case, smearing of the ink easily occurs on a medium (media) as the viscosity of the ink is low.

With regards to this, the inventor of the present application has considered suppressing the smearing of the ink by using ink (two-liquid type ink) for two-liquid method of fixing the ink using a fixing agent. In this case, the ink can be fixed before smearing occurs by bringing a fixing solution and the ink into contact immediately after the ink lands on the medium.

However, through thorough research, the inventor of the present application has found out that other problems, as will be described in detail below, sometimes occur even if the occurrence of the smearing is suppressed when the two-liquid type ink is used. Thus, it is conventionally desired to enable printing through a more appropriate method. The present disclosure thus provides a fixing agent amount setting method, a printing device, and a printing method capable of solving the problems described above.

When using the two-liquid type ink, the fixing agent fixes the ink to the medium by, for example, enhancing the viscosity of the ink. More specifically, in this case, for example, ink (latex ink, etc.) containing resin is used, and the resin is clumped together with the fixing agent to fix the ink to the medium. In this case, if the amount of fixing agent is deficient with respect to the amount of ink ejected onto the medium, for example, one part of the ink may remain to have low viscosity without fixing to the medium. As a result, smearing, for example, is assumed to easily occur. Thus, when using the two-liquid type ink, it is necessary to use a sufficient amount of fixing agent with respect to the amount of ink to appropriately suppress the smearing.

However, through thorough research, the inventor of the present application has found out that color blur in which a color represented by the ink is shifted from a desired color may occur when the fixing agent of an amount that can appropriately suppress the smearing of the ink is used. More specifically, in the inkjet printer, for example, various colors are represented using a plurality of colors of inks having colors different from each other. Furthermore, in this case, for example, various colors (e.g., each color of full color) are represented by variously making different the amount of ink of each color ejected to each position of the medium. In this case, color blur is that a large shift greater than a range permitted according to the quality of printing, and the like occur between the desired color to represent in the above manner and the actually observed color.

The inventor of the present application has carried out a further thorough research on the cause of such color blur. In the result of printing in which the color blur occurred, the inventor has found out that a great number of dots, which shift from the original position in design is large, are found for a dot position of the ink formed on the medium. Furthermore, the inventor has also found out that the cause in which such shift in position becomes large is related to an excessive amount of fixing agent. More specifically, the inventor of the present application has found out, by observing the state immediately after the landing of the ink and the fixing agent on the medium with a microscope, that when the amount of fixing agent is increased, a phenomenon in which the ink floats on the excessive fixing agent and the ink moves before being completely fixed to the medium, and the like occurs. Furthermore, in this case, for example, it has been found that the color blur occurs when the ink moves a distance greater than an inter-dot distance (dot interval) corresponding to a resolution of printing. It has been also confirmed that such phenomenon does not occur when the amount of fixing agent is small.

Based on such finding, the inventor of the present application has considered setting an upper limit value for a usage amount of the fixing agent from the standpoint of the amount of fixing agent (fixing agent density) at which the color blur does not occur. According to such configuration, for example, the color blur can be appropriately suppressed when carrying out printing using the two-liquid type ink. Furthermore, the inventor has found characteristics related to such effect through further thorough research and realized the present disclosure.

In other words, in order to solve the problem described above, there is provided a fixing agent amount setting method of setting a usage amount of a fixing agent, which is liquid for fixing a colored ink, which is an ink that represents a color, on a medium, where a fixing agent density, which is an amount of the fixing agent to eject per unit area is made to correspond with a colored ink density, which is an amount of the colored ink to eject per unit area, and set to a value smaller than or equal to an upper limit value of a fixing agent density corresponding to a maximum fixing agent density at which color unevenness does not occur on the medium.

According to such configuration, for example, the color blur can be appropriately suppressed when carrying out printing using the two-liquid type ink. Furthermore, printing through a more appropriate method, for example, thus can be carried out. In this case, for example, the lower limit value of the fixing agent density is preferably further set from a standpoint of the fixing agent density that can prevent the smearing of the ink. According to such configuration, for example, both the smearing and the color blur can be appropriately prevented when carrying out printing using the two-liquid type ink.

Furthermore, in a specific operation of setting the usage amount of the fixing agent, for example, it is considered to carry out the printing in advance on a medium of the same type as that to be used at the time of printing, and then set the fixing agent density. In this case, for example, the fixing agent density is set in correspondence with the colored ink density by checking the fixing agent density at which the smearing occurs on the medium and the fixing agent density at which the color unevenness occurs on the medium. According to such configuration, for example, the fixing agent density can be appropriately set.

Moreover, in this case, for example, it is considered to carry out printing on a medium using a test pattern set in advance so as to make the fixing agent density different in a plurality of stages, and set the upper limit value and the lower limit value based on the printing result. More specifically, in this case, for example, the lower limit value of the fixing agent density is set based on a minimum fixing agent density at which the smearing does not occur on the medium of the plurality of stages of fixing agent density. Furthermore, the upper limit value of the fixing agent density is set based on a maximum fixing agent density at which the color unevenness does not occur on the medium of the plurality of stages of fixing agent density. According to such configuration, for example, the lower limit value and the upper limit value of the fixing agent density can be appropriately set.

Furthermore, a pattern in which the colored ink density is also further made different in a plurality of stages, for example, is preferably used for the test pattern. In this case, for example, the minimum fixing agent density at which the smearing does not occur on the medium and the maximum fixing agent density at which the color unevenness does not occur on the medium are checked with respect to the respective colored ink density to set the upper limit value and the lower limit value of the fixing agent density in correspondence with the colored ink density. According to such configuration, for example, the lower limit value and the upper limit value of the fixing agent density can be appropriately set.

Furthermore, in this configuration, for example, using liquid containing a solvent that is volatilized and removed after landing on the medium for the fixing agent is considered. In this case, the upper limit value of the fixing agent density can be considered as a value at which the colored ink does not flow and move by the solvent until the solvent in the fixing agent is volatilized and removed by, for example, setting the fixing agent density to smaller than or equal to the upper limit value. According to such configuration, for example, the ink before being fixed can be appropriately prevented from moving on the medium. Furthermore, for example, the occurrence of color unevenness can be more appropriately suppressed.

Furthermore, in this configuration, the colored ink is, for example, ink of a basic color (process color) used for color printing. Moreover, for example, using inks of a plurality of colors different from each other for the colored ink is also considered. In this case, making the lower limit value and the upper limit value of the fixing agent density correspond with the colored ink density may be, for example, making the values correspond with a total colored ink density of the colored inks of a plurality of colors. Furthermore, the total colored ink density of the colored ink of a plurality of colors is, for example, a total amount of colored inks of a plurality of colors to eject per unit area.

Moreover, using ink containing resin, for example, for the colored ink is also considered. In this case, for example, the fixing agent clumps the resin in the colored ink together to fix the colored ink to the medium. According to such configuration, for example, the colored ink can be more appropriately fixed to the medium. More specifically, using latex ink, and the like, for example, for such colored ink is also considered.

The setting of the fixing agent amount is not completely set in advance, and for example, may be carried out by the adjustment at the time of printing. In this case, for example, it is considered to carry out the adjustment of the fixing agent density, and the like based on the printing result at the time of printing on the medium. More specifically, in this case, the fixing agent density is set according to the medium to use for printing by, for example, increasing the amount of fixing agent when the smearing occurs at the time of printing on the medium, and reducing the amount of fixing agent when the color unevenness occurs at the time of printing on the medium. Even when configured in such a manner, the fixing agent density can be appropriately set.

Furthermore, it is also considered to use a printing device and a printing method having characteristics similar to the above as the configuration of the present disclosure. In this case as well, for example, effects similar to the above can be obtained.

According to the present disclosure, printing through a more appropriate method can be carried out when, for example, carrying out printing using a two-liquid type ink.

BRIEF DESCRIPTION OF THE DRAWINGS

FIG. 1A shows one example of a configuration of a main part of the printing device 10. FIG. 1B shows one example of a configuration of a head portion 12 in the printing device 10. FIG. 1C is a view showing a variant of the configuration of the head portion 12.

FIG. 4A shows a result of printing carried out with the fixing agent density made different from each other. FIGS. 4B and 4C schematically show a state of an ink 202 on a medium 50.

FIG. 5 is a table showing the result of an experiment in which printing was carried out with the fixing agent density and the color printing density variously changed.

FIG. 6A shows one example of a setting of the fixing agent density. FIG. 6B shows one example of a test pattern to use at the time of setting the fixing agent density.

DETAILED DESCRIPTION OF EMBODIMENTS

Figure 1A:
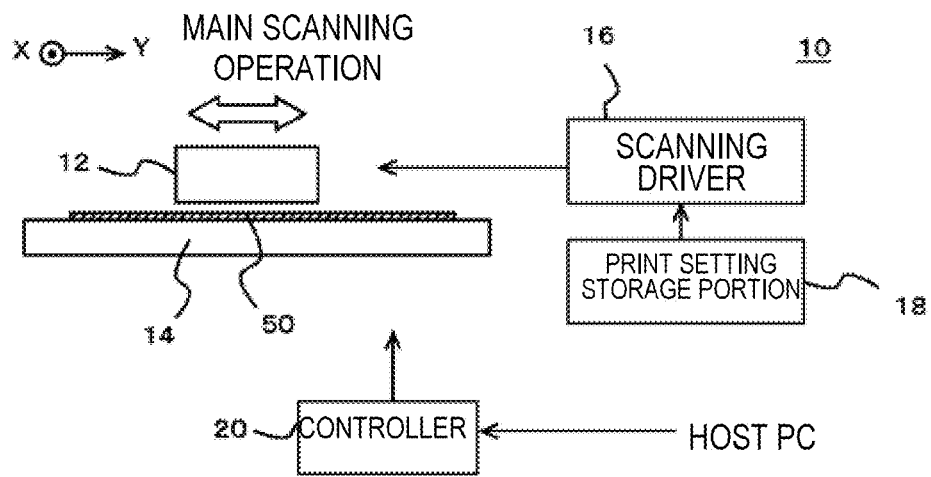
FIGS. 1A to 1C show one example of a printing device 10 according to one embodiment of the present disclosure.
Figure 1B:
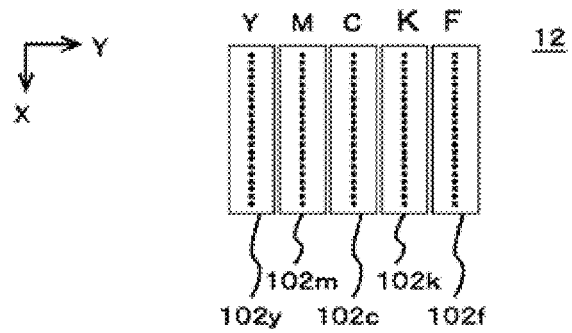
Figure 1C:
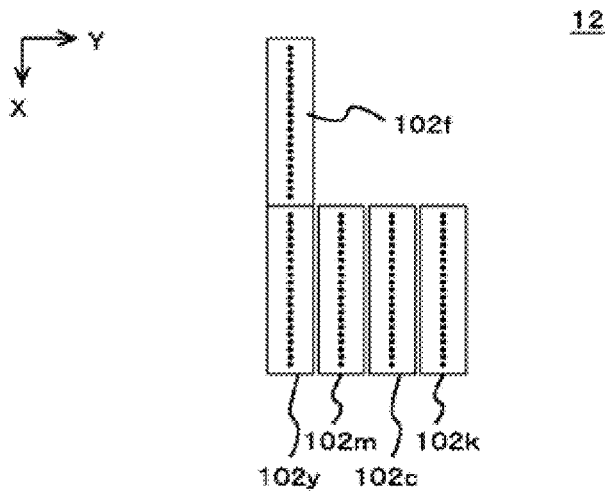

Hereinafter, an embodiment according to the present disclosure will be described with reference to the drawings. FIGS. 1A to 1C show one example of a printing device 10 according to one embodiment of the present disclosure. FIG. 1A shows one example of a configuration of a main part of the printing device 10. FIG. 1B shows one example of a configuration of a head portion 12 in the printing device 10. Other than the points described below, the printing device 10 may have features same as or similar to a known printing device. For example, the printing device 10 may further have a configuration same as or similar to the known printing device other than the illustrated configuration.

In the present example, the printing device 10 is an inkjet printer that carries out printing through the inkjet method on a medium (media) 50, and includes a head portion 12, a platen 14, a scanning driver 16, a print setting storage portion 18, and a controller 20. The head portion 12 is an ink ejecting portion that ejects ink on the medium 50, and ejects ink of each color to use for printing toward the medium 50. Furthermore, in the present example, the printing device 10 carries out printing on the medium 50 through a serial method of causing the head portion 12 to carry out a main scanning operation and a sub-scanning operation. In this case, causing the head portion 12 to carry out the main scanning operation and the sub-scanning operation means, for example, causing an inkjet head of the head portion 12 to carry out the main scanning operation and the sub-scanning operation. Furthermore, the main scanning operation is, for example, an operation of ejecting ink (ink droplet) while moving in a main scanning direction (Y direction in the figure) set in advance. Moreover, the sub-scanning operation is, for example, an operation of relatively moving with respect to the medium 50 in the sub-scanning direction (X direction in the figure) orthogonal to the main scanning operation.

Furthermore, in the present example, the head portion 12 includes a plurality of inkjet heads. The plurality of inkjet heads include, for example, an inkjet head 102$y$, an inkjet head 102$m$, an inkjet head 102$c$, an inkjet head 102$k$, and an inkjet head 102$f$, as shown in FIG. 1B. Each of the inkjet head 102$y$, the inkjet head 102$m$, the inkjet head 102$c$, and the inkjet head 102$k$ (hereinafter referred to as inkjet heads 102$y$ to 102$k$) is one example of a colored ink head, which is an ejecting head that ejects a colored ink. In this case, the colored ink is ink that represents color at the time of printing. Furthermore, in the present example, the ink ejected by each of the inkjet heads 102$y$ to 102$k$ is an ink of each color of a basic color (process color) used when representing various colors (e.g., each color of full color) through the subtractive color mixing method. More specifically, the inkjet head 102$y$ ejects Y (yellow) ink. The inkjet head 102$m$ ejects M (magenta) ink. The inkjet head 102$c$ ejects C (cyan) ink. The inkjet head 102$k$ ejects K (black) ink.

Furthermore, in the present example, the inkjet heads 102$y$ to 102$k$ eject latex ink (two-liquid type latex ink) for two-liquid method (two-liquid type). In this case, the two-liquid type ink refers to a color ink that fixes to the medium 50 by making contact with a fixing agent (Fix ink) having a predetermined property on the medium 50. Furthermore, the latex ink is, for example, ink containing latex resin. Polymer material such as aqueous polymer material, and the like, for example, can be suitably used for the latex resin. Furthermore, for example, a rubber-like polymer material, and the like can be suitably used for the polymer material. Moreover, in the present example, the latex ink is one example of an ink containing resin. In addition, a known two-liquid type latex ink, and the like, for example, can be suitably used as the latex ink used in the inkjet heads 102$y$ to 102$k$.

Among the plurality of inkjet heads of the head portion 12, the inkjet head 102$f$ is one example of a fixing agent head and ejects the fixing agent (fixing agent ink). In this case, the fixing agent is liquid for fixing the latex ink ejected from the inkjet heads 102$y$ to 102$k$ to the medium 50. Furthermore, more specifically, in the present example, the fixing agent ejected by the inkjet head 102$f$, for example, clumps the latex resin in the latex ink together to fix the latex ink to the medium 50. A known fixing agent, and the like corresponding to the latex ink used in the inkjet heads 102$y$ to 102$k$ can be suitably used for the fixing agent.

Furthermore, in the present example, the plurality of inkjet heads of the head portion 12 are arranged lined in the main scanning direction with the positions in the sub-scanning direction aligned. Thus, in the main scanning operation of each turn, each inkjet head of the head portion 12 ejects the ink of each color or the fixing agent while passing the same region on the medium 50. The head portion 12 thereby ejects the ink (color ink) of each color for the two-liquid type and the fixing agent onto the medium 50 through an in-line method. In this case, the in-line method is, for example, a method of ejecting the color ink and the fixing agent during the main scanning operation (pass) of the same turn with respect to each position on the medium 50.

The platen 14 is a table-like member for supporting the medium 50, and supports the medium 50 so as to face the head portion 12 by mounting the medium 50 on an upper surface. Furthermore, the platen 14 may interiorly include a heater for heating the medium 50, and the like. In this case, the heater, for example, heats the medium 50 at a temperature higher than an average room temperature to adjust the temperature of the region where the ink lands on the medium 50 to within a predetermined range. According to such configuration, for example, the influence of the environmental temperature is reduced, and the ink can be more appropriately fixed to the medium 50.

The scanning driver 16 is a driver for causing the head portion 12 to carry out the main scanning operation and the sub-scanning operation. More specifically, at the time of main scanning operation of each turn, the scanning driver 16, for example, causes the inkjet heads 102$y$ to 102$k$ to eject the ink (color ink) of each color in accordance with an image to be printed on the medium 50 according to the control of the controller 20. Furthermore, as will be described in further detail later, according to the density of the color ink ejected from the inkjet heads 102$y$ to 102$k$, the scanning driver 16 causes the inkjet head 102$f$ to fix the color ink. According to such configuration, for example, the color ink ejected in the main scanning operation of each turn can be appropriately fixed to the medium 50.

Furthermore, the scanning driver 16 causes the head portion 12 to carry out the sub-scanning operation between the main scanning operations to sequentially change the position facing the head portion 12 on the medium 50. In this case, in the sub-scanning operation of each turn, the scanning driver 16, for example, moves the head portion 12 relatively to the medium 50 by a feeding amount set according to a pass number of the printing, and the like. Furthermore, in the present example, the scanning driver 16 causes the head portion 12 to carry out the main scanning operation and the sub-scanning operation based on, for example, the setting of the printing operation stored in the print setting storage portion 18.

The print setting storage portion 18 is a storage portion for storing the setting of the printing operation. In this case, the setting of the printing operation is a parameter, or the like that specifies the operation of each portion of the printing device 10 at the time of main scanning operation, the sub-scanning operation, and the like. Furthermore, the setting of the printing operation is, for example, set in advance for each of various types of print modes that can be executed in the printing device 10 and the resolution of printing that can be specified. Moreover, in the present example, the print setting storage portion 18 is one example of a fixing agent density storage portion for storing a density (fixing agent density) of the fixing agent ejected from the inkjet head

102k. In this case, the fixing agent density is, for example, an amount (printing density of fixing agent) of fixing agent to eject per unit area at the time of main scanning operation of each turn. The setting of the fixing agent density will be described later in further detail.

The controller 20 is, for example, a CPU of the printing device 10, and controls the operation of each portion of the printing device 10. Furthermore, in the present example, the controller 20, for example, receives print data from a host PC, which is a computer for controlling the operation of the printing device 10, and controls the operation of each portion of the printing device 10 based on the print data. Moreover, the controller 20 may, for example, set at least some parameters, and the like to be used for the setting of the printing operation based on an instruction of a user received through the host PC. According to the present example, for example, the printing on the medium 50 can be appropriately executed using the two-liquid type ink.

In a variant of the configuration of the printing device 10, it is also considered to modify one part of the configuration described above, and the like. In this case, for example, it is considered to make the configuration of the head portion 12 different from the configuration shown in FIG. 1B. More specifically, in FIG. 1B, a configuration in which the inkjet head 102*f* is arranged on only one side of the inkjet heads 102*y* to 102*k* in the main scanning direction is illustrated for the configuration of the head portion 12 in the case of carrying out printing through the in-line method. However, in the variant of the configuration of the head portion 12, for example, the inkjet head 102*f* may be arranged on either side in the main scanning direction with respect to the arrangement of the inkjet heads 102*y* to 102*k*.

Furthermore, in the description made above, the printing operation carried out using the two-liquid type ink has been mainly described for a case of using the operation of the in-line method. However, it is considered to carry out the printing operation using the two-liquid type ink through methods other than the in-line method. In this case, for example, it is considered to carry out the printing through a base method with respect to each position of the medium 50. The base method is, for example, a method of first applying only the fixing agent and then ejecting the color ink thereafter on each position of the medium 50.

FIG. 1C is a view showing a variant of the configuration of the head portion 12, and shows one example of the configuration of the head portion 12 in the case of carrying out printing through the base method. In this case as well, the inkjet heads 102*y* to 102*k*, which are inkjet heads for the color ink, are arranged lined in the main scanning direction with the positions in the sub-scanning direction aligned. However, the inkjet head 102*f* is arranged with the position in the sub-scanning direction shifted from those of the inkjet heads 102*y* to 102*k*, as opposed to the case of the in-line method. Furthermore, in this case, each inkjet head is arranged such that the inkjet head 102*f* first ejects the fixing solution to each position of the medium 50, and thereafter, the inkjet heads 102*y* to 102*k* eject the color ink in the main scanning operations of other turns.

Even when configured in such manner, the color ink and the fixing agent can be appropriately ejected on each position of the medium 50. Furthermore, the printing on the medium 50 can be appropriately executed using the two-liquid type ink through the base method. Moreover, in a further variant of the configuration of the head portion 12, for example, it is considered to arrange at least some of the inkjet heads 102*y* to 102*k* with the positions in the sub-scanning direction shifted from the other inkjet heads.

As described above, in the present example, the inkjet head 102*f* is caused to eject the fixing agent based on the setting of the fixing agent density stored in the print setting storage portion 18 at the time of main scanning operation of each turn. In this case, the setting of the fixing agent density is set in advance according to the medium 50 to use for printing and other printing conditions. The manner of setting the fixing agent density will be hereinafter described in detail. In this case, the manner of setting the fixing agent density is, for example, a fixing agent amount setting method of setting the usage amount of the fixing agent.

First, for the sake of convenience of explanation, the result of experiment, and the like conducted by the inventor of the present application before determining the manner of setting the fixing agent density in the present example will be described. For the sake of convenience of illustration, in the figures of the present application, the result of printing carried out in the experiment is illustrated with a grayscale figure, and the like. However, in the actual experiment, the color printing is carried out using the ink of each color of YMCK and the fixing agent. Thus, the result of the experiment described below is, for example, the result in the case where the color printing is carried out.

Figure 2:
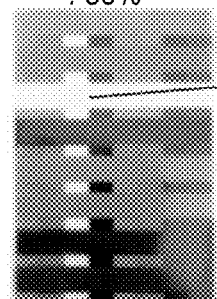
FIG. 2 is a view showing a result of an experiment conducted by the inventor of the present application.
Figure 2:
Figure 2:
Figure 2:
Figure 2:
Figure 2:
Figure 3:
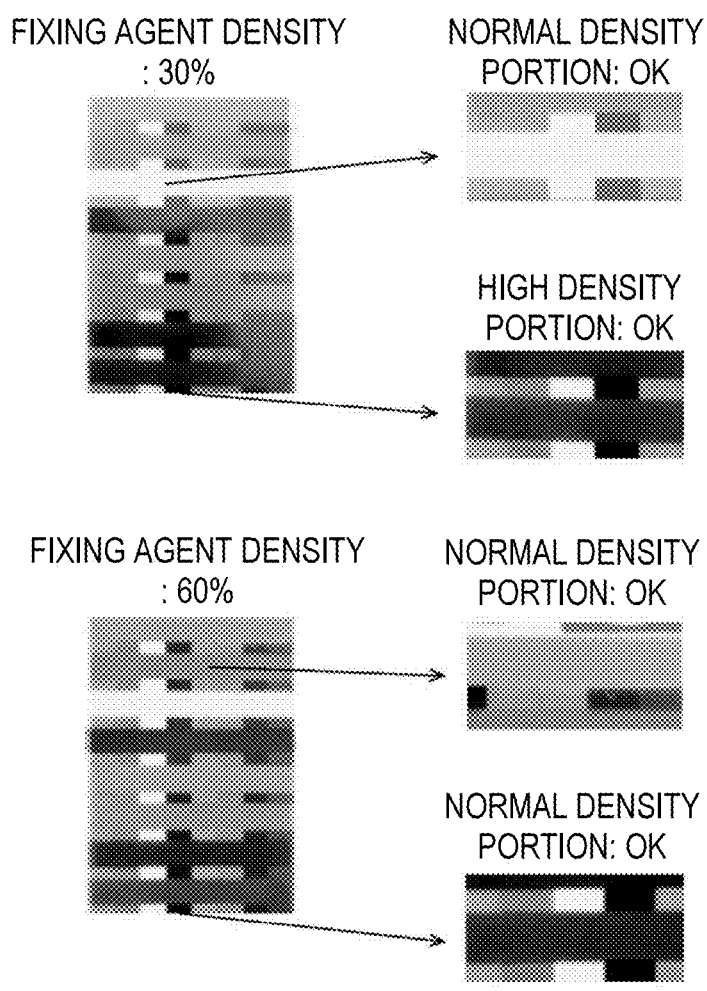
FIG. 3 is a view showing a result of an experiment conducted by the inventor of the present application.

FIGS. 2 and 3 are views showing the results of the experiment conducted by the inventor of the present application and show one example of a relationship of the result of color printing carried out using the two-liquid type latex ink and the fixing agent, and the fixing agent density. FIG. 2 is a view showing the printing result in the case where the printing is carried out through the base method, and shows the result of printing a pattern in which the color printing density is variously made different for cases of setting the fixing agent density to 30% and 60%, respectively. Furthermore, FIG. 3 is a view showing the printing result in the case where the printing is carried out through the in-line method, and shows the result of printing a pattern in which the color printing density is variously made different for cases of setting the fixing agent density to 30% and 60%, respectively.

With regards to the fixing agent density, the density of 100% refers to the density (print density) of when ejecting the fixing agent to all the ejecting positions set according to the resolution of printing. In this case, the ejecting position set according to the resolution of printing is, for example, a ejecting position in design set at a dot interval corresponding to the resolution. Furthermore, the density of 100% may also be considered as a density of for example, when filling at a predetermined density by a so-called solid printing.

Furthermore, the color printing density is, for example, the amount of color ink to eject per unit area at the time of main scanning operation of each turn. With regards to the color printing density, the density of 100% refers to the density (print density) of when ejecting the ink of any one color to all the ejecting positions set according to the resolution of printing. In this case, if the inks of a plurality of colors are ejected with respect to each ejecting position, the color printing density becomes a density exceeding 100%. For example, when ejecting the inks of two colors on each ejecting position, the color printing density becomes 200%. Furthermore, for example, when ejecting the inks of three colors on each ejecting position, the color printing density becomes 300%. Moreover, in the present example, the color printing density is one example of a colored ink density, which is the amount of colored ink to eject per unit area.

As shown in FIG. 2, for a case in which the printing is carried out through the base method, the result of printing, in which the pattern with variously different color printing density is printed, greatly differs depending on the fixing agent density. More specifically, for example, for the case of the result shown in the figure, in the printing result in which the fixing agent density was set to 30%, the printing was appropriately carried out while satisfying the normal quality demanded on the printing for a normal density portion, which is a portion other than a high density portion where the color printing density is set high. In this case, however, the smearing occurred and problems arose in the quality of printing at the high density portion.

Furthermore, in the printing result in which the fixing agent density was set to 60%, the printing was carried out while appropriately suppressing the smearing for both the high density portion and the normal density portion. The printing was thus appropriately carried out for the high density portion. However, color unevenness, which is a new problem, arose in the normal density portion. In this case, the color unevenness is, for example, a phenomenon (image quality unevenness) in which the color actually represented by the printing is shifted from the desired color to originally represent. Furthermore, in this case, the desired color to originally represent is, for example, the color set in the print data. Moreover, the color unevenness, for example, can also be considered as a phenomenon in which a difference with the desired color to originally represent goes beyond an acceptable range corresponding to the quality of printing, and the like. Furthermore, as will be described later in further detail, the color unevenness is a phenomenon completely different from the smearing.

When the printing is carried out through the in-line method, on the other hand, the printing was appropriately carried out for the high density portion and the normal density portion for when the fixing agent density is 30% and 60%, respectively, as shown in FIG. 3. Thus, the inventor of the present application at first considered the possibility that the cause of the problems of smearing and color unevenness as described above is carrying out the printing through the base method.

However, when the experiment of carrying out printing under conditions other than the illustrated result was further conducted, the occurrence of the problems of smearing and color unevenness was confirmed even when carrying out printing through the in-line method depending on the density of the fixing agent. For example, although not illustrated, when carrying out printing through the in-line method, the smearing easily occurs particularly in the high density portion when the fixing agent density is further lowered. Furthermore, when the fixing agent density is further increased, the color unevenness easily occurs particularly in the normal density portion.

With regards to this, the problem in which the smearing occurs when the fixing agent density is low is assumed to arise because, for example, when the fixing agent is deficient with respect to the amount of ink ejected on the medium 50, a state of low ink viscosity continues even after the ink lands on the medium 50, and hence mixing of ink may occur on the medium 50. Thus, the problem of smearing can be considered as a problem similar to the problem of smearing typical in the inkjet printer.

However, the occurrence of color unevenness when the fixing agent density is high is not a generally known phenomenon. Furthermore, at the time point when the inventor of the present application conducted the experiments described above, the cause of occurrence of such color unevenness was unknown. The inventor of the present application has thus carried out further thorough research to find the cause of such color unevenness.

Figure 4A:
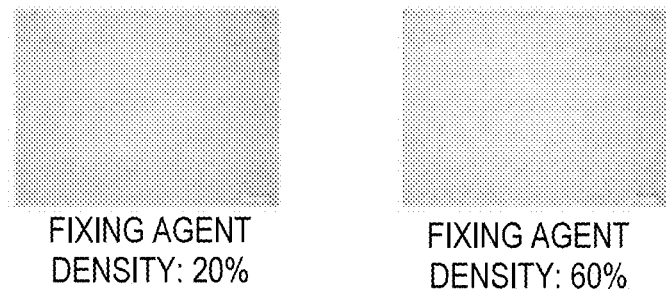
FIGS. 4A to 4C are views describing color unevenness in further detail.
Figure 4B:
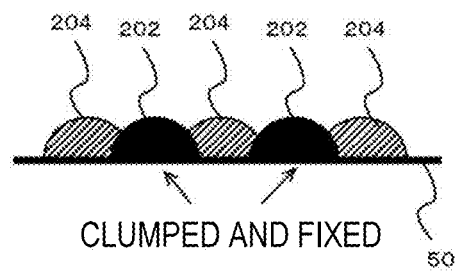
Figure 4C:
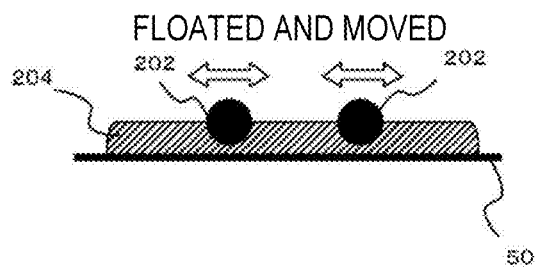

FIGS. 4A to 4C are views describing the color unevenness in further detail. FIG. 4A shows a result of printing carried out with the fixing agent density made different from each other. In the figure, the left side shows a photograph of the result of carrying out the printing with the fixing agent density set to 20%. The right side shows a photograph of the result of carrying out the printing with the fixing agent density set to 60%. Of these results, the color unevenness occurred in the result of when the fixing agent density is set to 60%.

The inventor of the present application has investigated the cause of the occurrence of color unevenness by observing, with a microscope, the state of the ink and the fixing agent immediately after the ink and the fixing agent land on the medium while carrying out the printing under various conditions. The inventor has then found out that when the amount of fixing agent is large, a phenomenon in which the ink floats on the excessive fixing agent and the ink moves before completely being fixed to the medium, and the like occur.

FIGS. 4B and 4C schematically show a state of an ink 202 on a medium 50. FIG. 4B is a view showing a state of the ink 202 of when the fixing agent density is an appropriate amount, and schematically shows the state of the ink 202 and the fixing agent 204 on the medium 50 for when ejecting the ink 202 and the fixing agent 204 on the medium 50 through the in-line method. FIG. 4C schematically shows the state of the ink 202 and the fixing agent 204 on the medium 50 for when the fixing agent density is too high.

When ejecting the ink 202 through the inkjet method from the inkjet heads 102$y$ to 102$k$ (see FIGS. 1 A to 1C), the ink 202 usually spreads in a dot form at the landing position at least immediately after landing on the medium 50. Furthermore, when ejecting the fixing agent through the inkjet method from the inkjet head 102$f$ (see FIGS. 1A to 1C), the fixing agent also lands on the medium 50 in a state same as or similar to the inks ejected from the inkjet heads 102$y$ to 102$k$. Thus, if the fixing agent density is appropriate, the fixing agent also usually spreads in a dot form at the landing position at least immediately after the landing. In this case, for example, as shown in FIG. 4B, the dot of the ink 202 and the dot of the fixing agent 204 are formed proximate to each other and brought into contact, so that the ink 202 is fixed to the medium 50. Furthermore, the ink 202 formed at the landing position of the ink 202 is thereby clumped together in the state of the dot form and fixed to the medium 50.

When the fixing agent density is low, for example, the ink 202 does not completely solidify, and for example, the ink 202 with low viscosity is assumed to spread in such a manner as flowing out from the surrounding fixing agent 204. Thus, the smearing is assumed to easily occur when the fixing agent density is low.

On the other hand, when the fixing agent density is too high, for example, as shown in FIG. 4C, the fixing agent 204 that has landed on the medium 50 connects to the fixing agent 204 landed at another position, thereby forming a continuous liquid region rather than a discrete dot. In this case, when referring to the fixing agent 204 forming a continuous liquid region, this means, for example, that the fixing agent 204 continuously covers the surface of the medium 50 over a larger range than the inter-dot distance (dot interval) corresponding to the resolution of printing. In this case, the ink 202 ejected by the inkjet heads 102$y$ to 102$k$ lands on the medium 50 so as to be, for example, placed on the fixing agent 204.

Furthermore, in this case, the ink 202 is in a floating state on the fixing agent 204, as shown in the figure. Furthermore, as a result, the ink 202 is in a floating state (suspended state) and an easily movable state, for example, until the fixing agent 204 dries. Thus, in this case, the ink 202 can easily move to a position distant from the landing position until the ink 202 is completely fixed to the medium 50. As a result, the ink of each color ejected to each ejecting position to represent the desired color is sometimes fixed to the medium 50 at a position shifted from the intended ejecting position. As a result, the color blur is assumed to occur. More specifically, the inventor of the present application confirmed that the color blur occurs because the ink 202 moves a distance greater than the inter-dot distance corresponding to the resolution of printing until the ink is fixed to the medium 50 when the fixing agent density is high. It was also confirmed that such phenomenon does not occur when the amount of fixing agent is small.

When using the two-liquid type ink 202, the ink 202 changes to a state of high viscosity by making contact with the fixing agent 204. Thus, if the amount of fixing agent 204 is in excess, the ink 202 will float on the fixing agent 204 with the viscosity increased. In this case, even if the ink 202 moves, the ink will not mix with the ink of another color thus causing smearing. Therefore, as described above, such color blur is a problem completely different from the smearing.

Next, the relationship of the fixing agent density and the printing result will be described in further detail. FIG. 5 is a table showing the result of an experiment in which printing was carried out with the fixing agent density and the color printing density variously changed. Furthermore, in this experiment, the printing of forming one layer of ink and three layers of ink was carried out, as shown in the figure. In this case, the printing for forming one layer of ink is a normal printing for drawing an image on a medium using the ink (color ink) of each color of YMCK. The printing for forming three layers of ink is a printing for forming three layers of ink by a so-called multi-layer printing. Furthermore, more specifically, in this experiment, the white ink was further used in addition to the ink of each color of YMCK, and the layer of first color ink, the layer of white ink, and the layer of second color ink were formed in an overlapping manner. In this case, the layer of color ink is the layer of ink formed using the ink of each color of YMCK. Moreover, the printing was carried out with the color printing density and the fixing agent density variously changed for the conditions of printing. Furthermore, in relation to the manner of (order of) landing the fixing agent and the color ink on the medium, the printing was carried out using the respective methods of the base method and the in-line method. In the table, a circle symbol indicates that the smearing and the color unevenness in question did not occur and the printing was carried out appropriately. Letter A indicates that the smearing in question occurred. Letter B indicates that the color unevenness in question occurred.

As apparent from the results shown in the table, it can be seen that the smearing easily occurs when the fixing agent density is low, and the color unevenness easily occurs when the fixing agent density is high irrespective of which one of the base method and the in-line method is used. Furthermore, it can also be seen that the fixing agent density at which the smearing and the color unevenness occur differs depending on the color printing density, and the like. Thus, when based on these results, the fixing agent density is assumed to be preferably changed, for example, according to the color printing density. Furthermore, in this case, for example, it is assumed to be preferable to set the fixing agent density at which the smearing and the color unevenness do not occur in correspondence with the color printing density.

As apparent from the results shown in the table, the fixing agent density at which the smearing and the color unevenness occur differs according to the conditions of printing. For example, when comparing the base method and the in-line method, the fixing agent density at which the color unevenness occurs tends to become higher in the in-line method. This is assumed to be because, for example, in the case of the base method, the fixing agent is applied over a wide range before the ejecting of the color ink and hence the phenomenon in which the color ink floating on the fixing agent moves tends to easily occur, whereas in the case of the in-line method, the fixing agent and the color ink are simultaneously ejected at the time of main scanning operation of each turn and hence for example, the fixing agent and the color ink alternately land on the medium, and the color ink can be fixed to the medium before the color ink greatly moves. Furthermore, when comparing the base method and the in-line method, the range of fixing agent density at which the printing can be carried out without causing smearing and color unevenness is wider in the in-line method. The similar reason, for example, can be considered for this point as well.

The fixing agent density at which the smearing and the color unevenness occur also changes by the layer of ink to form. This is assumed to be because, for example, in the case of carrying out the multi-layer printing, the state of the region on which the ink lands differs between when the ink directly lands on the medium and when the ink lands on the layer of another ink. Thus, the fixing agent density is preferably set in correspondence with the color printing density, for example, for every condition (printing condition) to carry out the printing. Furthermore, in the range of the results shown in the table, the smearing or the color unevenness did not occur at some color printing densities. In this case as well, however, the smearing is assumed to occur for example, if the fixing agent density is further lowered. Furthermore, the color unevenness is assumed to occur, for example, if the fixing agent density is further increased.

Figure 6A:
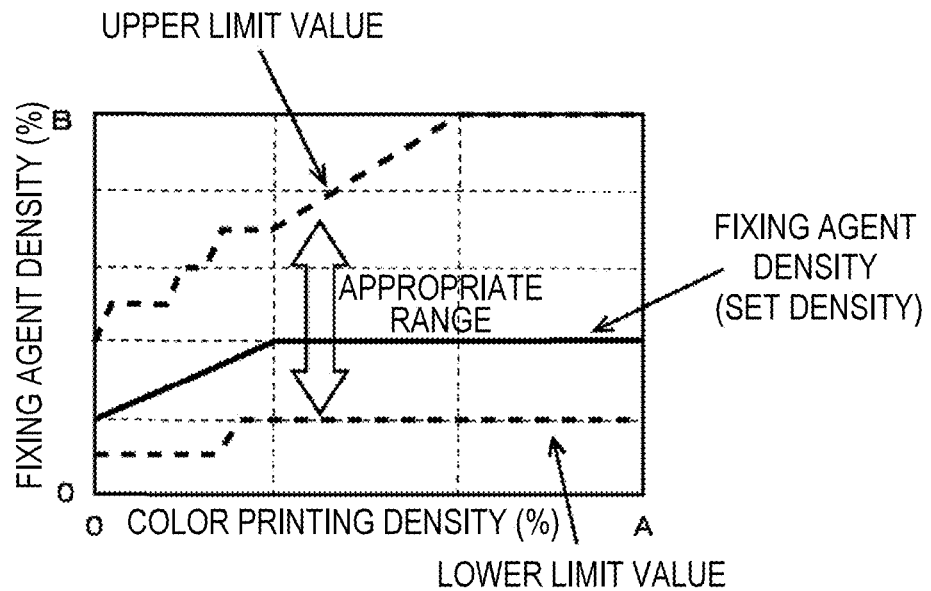
FIGS. 6A and 6B are views describing the setting of the fixing agent density in further detail.
Figure 6B:
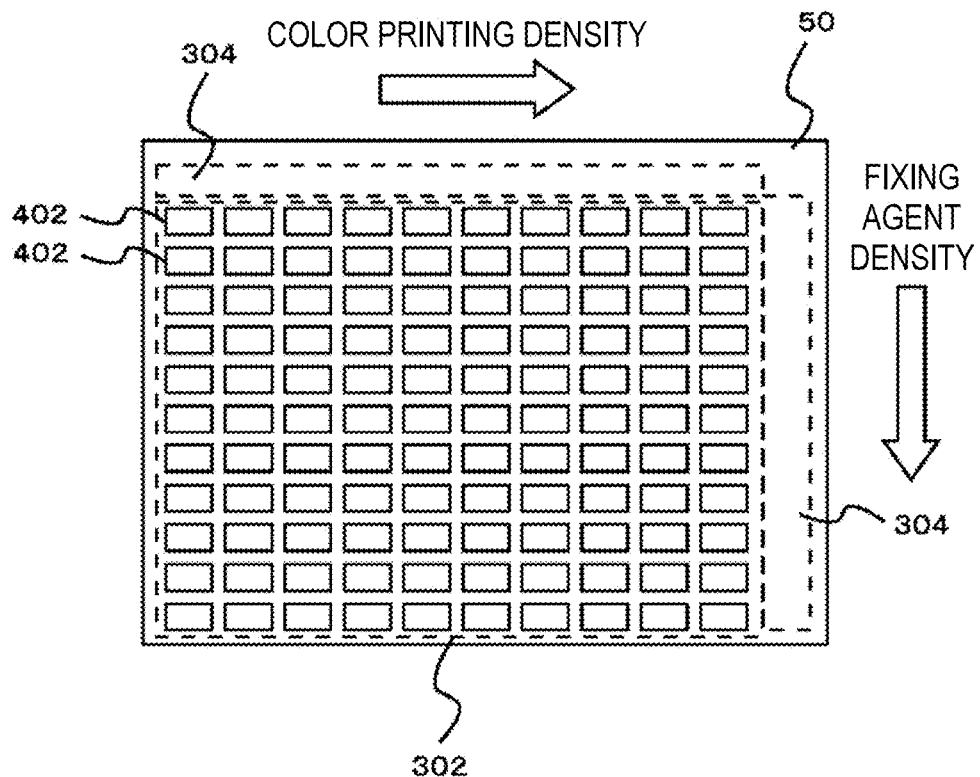

Next, the setting of the fixing agent density carried out in the present example will be described in further detail. FIGS. 6A and 6B are views describing the setting of the fixing agent density in further detail. FIG. 6A is a graph showing one example of the setting of the fixing agent density, and shows one example of a manner of setting the fixing agent density corresponding to the color printing density. Furthermore, in FIG. 6A, the color printing density is illustrated in a range up to a predetermined density A %, as shown in the figure, for the sake of convenience of illustration. Moreover, the fixing agent density is illustrated in a range up to a predetermined density B %.

As also described above, when carrying out printing using the two-liquid type ink and the fixing agent, the smearing occurs if the fixing agent density is too low with respect to the color printing density. Furthermore, the color unevenness occurs if the fixing agent density is too high with respect to the color printing density. Thus, an appropriate range of the fixing agent density corresponding to the color printing density has a lower limit value determined from the standpoint of preventing the smearing of the ink and an upper limit value determined from the standpoint of preventing the color unevenness. In this case, the lower limit value of the fixing agent density can be considered as, for example, a value corresponding to a minimum fixing agent density at which the smearing does not occur on the medium. Furthermore, the upper limit value can be considered as, for example, a value corresponding to a maximum fixing agent density at which the color unevenness does not occur on the medium. The upper limit value and the lower limit value change as shown in the figure, for example, according to the color printing density.

In the present example, the fixing agent density of ejecting the fixing agent at the time of printing is set to a value of greater than or equal to the lower limit value and smaller than or equal to the upper limit value corresponding to the color printing density in correspondence with the color printing density. According to such configuration, for example, the smearing and the color blur can be appropriately prevented when carrying out printing using the two-liquid type ink. Furthermore, for example, the printing carried out using the two-liquid type ink can be more appropriately carried out at high accuracy.

When referring to making the fixing agent density correspond with the color printing density, this means, for example, making the fixing agent density correspond with the total color printing density of the color inks of a plurality of colors. Furthermore, the total color printing density of a plurality of colors is, for example, a total amount of the color inks of a plurality of colors to eject per unit area. Moreover, as also described above, the fixing agent density at which the smearing and the color unevenness occur also changes according to the printing condition. Thus, in the present example, for example, the fixing agent density is set in correspondence with the color printing density for every printing condition for actually carrying out the printing. For example, when the type of medium to use in the printing is different or when the setting of the printing such as the resolution, and the like are different, the fixing agent density is assumed to be set with respect to the respective printing condition. Furthermore, in the printing device 10 (see FIGS. 1A to 1C), when a plurality of types of inks having different properties from each other and the fixing agent can be used, it is considered to set the fixing agent density for every combination of the ink and the fixing agent.

More specifically, for the setting of the fixing agent density, consideration is made to, for example, carry out the printing in advance with respect to the medium of the same type as that to be used at the time of printing, and then carry out the setting. In this case, for example, the fixing agent density is set in correspondence with the color printing density by checking the fixing agent density at which the smearing occurs on the medium and the fixing agent density at which the color unevenness occurs on the medium. Furthermore, at the time of setting the fixing agent density, it is considered to, for example, print a test pattern (density chart) set in advance, and use the printing result thereof as a reference.

FIG. 6B shows one example of a test pattern to use at the time of setting the fixing agent density. In the present example, using a pattern including a pattern region 302 and an information region 304, as shown in the figure, for example, for the test pattern is considered. In this case, the pattern region 302 is a region including a pattern for checking the state of printing. More specifically, in the pattern region 302, a patch portion 402, which is a region where the printing is carried out with the color printing density and the fixing agent density variously made different, is printed in a line. In this case, for example, it is considered to print a plurality of patch portions 402 in a line on an array in a longitudinal direction and a lateral direction of the medium 50. Furthermore, in this case, making the color printing density different according to one position in the longitudinal direction and the lateral direction, and making the fixing agent density different according to the other position is considered. More specifically, for example, in the case shown in the figure, it is considered to print the patch portion 402 in the leftmost column in the figure in the lateral direction of the medium 50 with the lowest color printing density, and gradually increase the color printing density toward the right side. Furthermore, it is considered to have the fixing agent density at the time of printing the patch portion 402 in the uppermost row in the figure in the longitudinal direction of the medium 50 to be the lowest, and gradually increase the fixing agent density toward the lower side. According to such configuration, for example, each of the color printing density and the fixing agent density can be made different in a plurality of stages in the test pattern.

Furthermore, in this case, the medium 50, the color ink, and the fixing agent of the same type as those used at the time of printing to be subsequently carried out are used, and the test pattern is printed with the same setting (e.g., same resolution, etc.) as the printing condition set at the time of printing. According to such configuration, for example, the test pattern can be appropriately checked in accordance with the printing condition of the printing to be subsequently carried out.

Furthermore, in the test pattern, the information region 304 is a region for displaying characters and the like indicating the content of the test pattern. For example, it is considered to display the color printing density and the fixing agent density corresponding to each patch portion 402, and the like in the information region 304. Furthermore, in this case, for example, it is considered to display the color printing density, the fixing agent density, or the like set identically in the relevant row or column for every row and column of the array of the patch portion 402. According to such configuration, for example, at the time of checking the test pattern, the correspondence between setting of the color printing density and the fixing agent density, and the state of printing can be more easily and appropriately checked.

Moreover, when using such a test pattern, for example, the minimum fixing agent density at which the smearing does not occur on the medium 50 and the maximum fixing agent density at which the color unevenness does not occur on the medium 50 are checked with respect to the respective color printing densities by checking the state of the respective patch portions 402. Thus, the upper limit value and the lower limit value of the fixing agent density are set in correspondence with the color printing density. In this case, the upper limit value and the lower limit value of the fixing agent density are, for example, an upper limit value and a lower limit value of an appropriate range of the fixing agent density. More specifically, in this case, for example, the minimum fixing agent density at which the smearing does not occur on the medium 50 of a plurality of stages of fixing agent density variously made different with respect to the same color printing density is set as the lower limit value of the fixing agent density for each of the plurality of stages of color printing density variously made different at the time of printing the test pattern. Similarly, the maximum fixing agent density at which the color unevenness does not occur on the medium 50 of the plurality of stages of fixing agent density is set as the upper limit value of the fixing agent density. According to such configuration, for example, the lower limit value and the upper limit value of the fixing agent density can be appropriately set.

Furthermore, in this case, as described above, the fixing agent density used at the time of printing is set to a value greater than or equal to a lower limit value and smaller than or equal to an upper limit value corresponding to the color printing density in correspondence with the color printing density. The set fixing agent density is stored in the print setting storage portion 18 (see FIGS. 1A to 1C) in correspondence with the color printing density. Furthermore, at the time of printing, the setting of the fixing agent density is read out from the print setting storage portion 18 by the controller 20 (see FIGS. 1A to 1C), and the inkjet head 102f (see FIGS. 1A to 1C) is caused to eject the fixing agent based on the read setting. According to such configuration, for example, when carrying out printing using the two-liquid type ink, the fixing agent of an appropriate range in which the smearing and the color unevenness do not occur can be appropriately ejected.

Furthermore, in this case, the print setting storage portion 18 may store, for example, the upper limit value and the lower limit value of the fixing agent density in correspondence with the color printing density. According to such configuration, for example, when adjusting the fixing agent density, the fixing agent density can be more appropriately adjusted with reference to the lower limit value and the upper limit value. The setting of the fixing agent density may be carried out by the adjustment at the time of printing instead of being carried out in advance using the test pattern, and the like. In this case, the adjustment at the time of printing means, for example, appropriately changing the fixing agent density according to the printing result at the time of printing to change the setting of the fixing agent density to use at the time of printing to be subsequently carried out. More specifically, in this case, for example, it is considered to increase the amount of fixing agent density when the smearing occurs at the time of printing on the medium 50, and reduce the amount of fixing agent density when the color unevenness occurs at the time of printing on the medium 50. When configured in such a manner as well, for example, the fixing agent density between the upper limit value and the lower limit value corresponding to the color printing density can be appropriately set in accordance with the condition of the medium 50, and the like to use for the printing.

Next, a supplementary explanation will be made in relation to the manner of setting the fixing agent density, and the like carried out in the present example. As described above, in the present example, the upper limit value of the fixing agent density is a value determined from the standpoint of not causing the color unevenness on the medium 50. In association with this aspect, in the present example, using a liquid containing a solvent that is volatilized and removed after landing on the medium 50, for example, for the fixing agent is considered. In this case, the upper limit value of the fixing agent density can also be considered as a value at which the color ink does not flow and move by the solvent until the solvent in the fixing agent is volatilized and removed by, for example, setting the fixing agent density to smaller than or equal to the upper limit value. According to such configuration, for example, the color ink before being fixed can be appropriately prevented from moving on the medium 50. Furthermore, for example, the occurrence of color unevenness can be more appropriately suppressed.

Furthermore, as described above, in the present example, the fixing agent density is set to a value between the lower limit value and the upper limit value corresponding to the color printing density. In this case, the relationship between the color printing density and the fixing agent density can be assumed to be set to, for example, the relationship in which the fixing agent density changes between the upper limit value and the lower limit value in a curved form according to the color printing density. In this case, it is preferable to set it so that the fixing agent density changes in a continuous curved form, and the like. It is also considered to set the manner of changing the fixing agent density to a linear form, a broken line form, or the like.

Furthermore, in this case, the fixing agent density of an appropriate range in which the smearing and the color unevenness do not occur can be appropriately set with respect to a wide range of color printing density, for example, by changing the fixing agent density according to the color printing density. In this case, the occurrence of smearing can also be appropriately suppressed even when the color printing density is high, and thus for example, high density printing, and the like can be more appropriately carried out. Furthermore, for example, the printing can be more appropriately carried out even when carrying out printing under various conditions such as multi-layer printing. Thus, according to the present example, for example, high image quality printing can be more appropriately carried out under various printing conditions. Furthermore, for example, the usage amount of the fixing agent can be suppressed by using the fixing agent of an appropriate range.

In the present example, the printing can be appropriately carried out on various media 50 by using the two-liquid type latex ink. Using a medium of various materials such as vinyl chloride, PP, PET, PC, or acryl for the medium 50 is considered. Furthermore, in this case, the printing can be carried out with a quality of higher than or equal to the case of using the ultraviolet curable ink, and the like, for example, on various media 50 by using the fixing agent of an appropriate range and carrying out high image quality printing. More specifically, for example, the printing with a quality higher than or equal to the case of using the ultraviolet curable ink can be carried out in terms of adhesiveness, durability, and image quality on the medium 50.

Furthermore, by using aqueous latex ink, for example, for the latex ink, high safety, low odor property, and the like can be realized compared to the case where, for example, solvent ink containing volatile organic solvent, and the like are used or the case where an ultraviolet curable ink containing monomer, and the like are used. Furthermore, for example, an environmental load can also be reduced. Using ink other than the latex ink, for example, for the two-liquid type ink is also considered. In this case, various two-liquid type inks to be fixed to the medium 50 using the fixing agent can be considered for use. More specifically, in this case, for example, using various inks which cause chemical or physical reaction by making contact with the fixing agent thus enhancing the viscosity can be considered. Furthermore, in this case, using liquid having a property corresponding to the ink for the fixing agent is considered. Even when configured in such a manner as well, high quality printing can be appropriately carried out by setting the fixing agent density in view of the smearing and the color unevenness.

INDUSTRIAL APPLICABILITY

The present disclosure can be suitably used in, for example, a fixing agent amount setting method.

What is claimed is:
1. A fixing agent amount setting method of setting a usage amount of a fixing agent, the fixing agent being a liquid for fixing a colored ink on a medium, the colored ink being an ink that represents a color, wherein
a fixing agent density, which is an amount of the fixing agent to eject per unit area is made to correspond with a colored ink density, which is an amount of the colored ink to eject per unit area, and the fixing agent density is set to a value smaller than or equal to an upper limit value of a fixing agent density corresponding to a maximum fixing agent density at which a color unevenness does not occur on the medium.

2. The fixing agent amount setting method according to claim 1, wherein
printing is carried out in advance with respect to the medium of a same type as a medium used at a time of printing, and
the fixing agent density is set in correspondence with the colored ink density by checking the fixing agent density at which the color unevenness occurs on the medium.

3. The fixing agent amount setting method according to claim 1, wherein
the fixing agent density is set to a value greater than or equal to a lower limit value of the fixing agent density corresponding to a minimum fixing agent density at which a smearing does not occur on the medium in correspondence with the colored ink density.

4. The fixing agent amount setting method according to claim 2, wherein
the fixing agent density is set to a value greater than or equal to a lower limit value of the fixing agent density corresponding to a minimum fixing agent density at which a smearing does not occur on the medium in correspondence with the colored ink density.

5. The fixing agent amount setting method according to claim 3, wherein
printing is carried out on the medium using a test pattern set in advance so as to make the fixing agent density different in a plurality of stages,
the lower limit value of the fixing agent density is set based on the minimum fixing agent density at which the smearing does not occur on the medium of the plurality of stages of the fixing agent density, and
the upper limit value of the fixing agent density is set based on the maximum fixing agent density at which the color unevenness does not occur on the medium of the plurality of stages of the fixing agent density.

6. The fixing agent amount setting method according to claim 4, wherein
printing is carried out on the medium using a test pattern set in advance so as to make the fixing agent density different in a plurality of stages,
the lower limit value of the fixing agent density is set based on the minimum fixing agent density at which the smearing does not occur on the medium of the plurality of stages of the fixing agent density, and
the upper limit value of the fixing agent density is set based on the maximum fixing agent density at which the color unevenness does not occur on the medium of the plurality of stages of the fixing agent density.

7. The fixing agent amount setting method according to claim 5, wherein
a pattern in which the colored ink density is further made different in a plurality of stages is used for the test pattern, and
the minimum fixing agent density at which the smearing does not occur on the medium and the maximum fixing agent density at which the color unevenness does not occur on the medium are checked with respect to the respective colored ink density to set the upper limit value and the lower limit value of the fixing agent density in correspondence with the colored ink density.

8. The fixing agent amount setting method according to claim 6, wherein
a pattern in which the colored ink density is further made different in a plurality of stages is used for the test pattern, and
the minimum fixing agent density at which the smearing does not occur on the medium and the maximum fixing agent density at which the color unevenness does not occur on the medium are checked with respect to the respective colored ink density to set the upper limit value and the lower limit value of the fixing agent density in correspondence with the colored ink density.

9. The fixing agent amount setting method according to claim 1, wherein
the fixing agent contains a solvent volatilized and removed after landing on the medium, and
the upper limit value is a value at which the colored ink does not flow and move by the solvent until the solvent in the fixing agent is volatilized and removed by setting the fixing agent density to smaller than or equal to the upper limit value.

10. The fixing agent amount setting method according to claim 1, wherein
the colored ink is an ink containing a resin, and
the fixing agent clumps the resin in the colored ink together to fix the colored ink to the medium.

11. The fixing agent amount setting method according to claim 1, wherein
the colored ink is a latex ink.

12. The fixing agent amount setting method according to claim 1, wherein
the fixing agent density is set so that the fixing agent density becomes greater according to increase in the colored ink density.

13. The fixing agent amount setting method according to claim 1, wherein
the fixing agent density is adjusted based on a printing result at a time of printing on the medium,
an amount of the fixing agent density is increased when a smearing occurred at the time of printing on the medium, and
an amount of the fixing agent density is reduced when a color unevenness occurred at the time of printing on the medium, so as to set the fixing agent density according to the medium to use for printing.

14. A printing device that carries out printing on a medium, the printing device comprising:
a colored ink head, being an ejecting head that ejects a colored ink;
a fixing agent head, being an ejecting head that ejects a fixing agent; and
a fixing agent density storage portion that stores a setting of the fixing agent density, wherein
the fixing agent density storage portion stores the setting of the fixing agent density set through the fixing agent amount setting method according to claim 1, and
the fixing agent head ejects the fixing agent based on the setting of the fixing agent density stored in the fixing agent density storage portion.

15. A printing method that carries out printing on a medium, wherein the printing method using:
a colored ink head, being an ejecting head that ejects a colored ink, and
a fixing agent head, being an ejecting head that ejects a fixing agent,
wherein the fixing agent head is caused to eject the fixing agent based on a setting of the fixing agent density set through the fixing agent amount setting method according to claim 1.

* * * * *